United States Patent [19]

Dodson

[11] 4,230,580

[45] Oct. 28, 1980

[54] SLURRY DIGESTER AND CAPPING ARRANGEMENT FOR USE THEREIN

[75] Inventor: Christopher Dodson, Reading, England

[73] Assignee: Commonwork Enterprises Limited, Edenbridge, England

[21] Appl. No.: 920,202

[22] Filed: Jun. 29, 1978

[30] Foreign Application Priority Data

Jun. 29, 1977 [GB] United Kingdom .............. 27295/77
May 31, 1978 [GB] United Kingdom .............. 27295/78

[51] Int. Cl.³ .......................... C02C 1/14; F24J 3/02
[52] U.S. Cl. .................................. 210/170; 210/180; 210/187; 210/220; 210/DIG. 9; 220/18; 405/53
[58] Field of Search ................ 210/2, 14, 16, 60, 170, 210/180, 181, 187, 218, 220, 221 R, DIG. 9; 220/18; 405/52, 53, 55–57

[56] References Cited

U.S. PATENT DOCUMENTS

| 2,190,598 | 2/1940 | Fischer | 210/181 X |
|---|---|---|---|
| 2,542,602 | 2/1951 | Walker | 210/181 X |
| 2,638,444 | 5/1953 | Kappe | 210/220 X |
| 2,986,302 | 5/1961 | Paulet | 405/55 X |
| 3,194,756 | 7/1965 | Walker | 210/220 X |
| 3,206,032 | 9/1965 | Nottingham et al. | 210/197 X |
| 3,246,761 | 4/1966 | Bryan et al. | 210/187 X |
| 3,516,568 | 6/1970 | Fish | 405/55 X |
| 3,933,628 | 1/1976 | Varani | 210/170 X |
| 4,040,963 | 8/1977 | Garrott, Jr. | 210/220 X |

Primary Examiner—Robert H. Spitzer
Attorney, Agent, or Firm—Browdy and Neimark

[57] ABSTRACT

A modular capping arrangement for an anaerobic slurry digester comprising a basin which may conveniently be dug out of the earth and a plurality of elongate capping members of inverted channel form comprising wall members which, when the channel members are placed in side-by-side arrangement, define therebetween channels which are upwardly open. The capping members are formed with outlets in upper regions thereof for removal of gas produced during slurry digestion and are weighted down on the slurry by ballast means positioned in the upwardly open channel. The capping members are disposed in parallel arrangement and held together at the ballast means and are so formed that the capping arrangement is capable of floating on a body of slurry while being held thereon by the ballast means and being lifted therefrom by gas under pressure thereunder.

37 Claims, 5 Drawing Figures

SLURRY DIGESTER AND CAPPING ARRANGEMENT FOR USE THEREIN

This invention relates to anaerobic slurry digesters and more particularly to a capping arrangement for an anaerobic slurry digester which enables slurry digestion to be controlled in a particularly effective manner.

Slurry digesters for use in the purification of sewage slurries generally take the form of massive concrete containers located above ground. Whilst the slurry digesters of such size may be required for handling urban sewage, they do not require such size when employed in rural locations, particularly on farms where they may be required to handle slurry resulting, for example, from the hosing out of animal sheds. Moreover, in such rural environments, massive concrete settling tanks are visually unattractive.

Insofar as slurry digesters intended for rural use in particular have hitherto been devised, including the so-called Ghoba digesters, German domestic sewage digesters and Chinese mass applied underground systems which are allied to small scale industrial plants, the most striking fact which has arisen is that almost every system is in practice a "one-off". None of the systems described for small scale use is in any way adaptable for really large scale energy farms or industrial effluent treatment without considerable problems in structural engineering and mechanical handling.

It is an object of this invention to provide an anaerobic slurry digester system which can be constructed in a wide variety of sizes utilizing the same constructional principle in each case.

It is a further object of the invention to provide a modular capping arrangement for a slurry tank which capping arrangement can be constructed from a plurality of standard modules in accordance with the size of the tank.

According to one aspect of this invention, there is provided a capping arrangement for an anaerobic slurry digester of substantially rectangular horizontal cross-section, the capping arrangement comprising a plurality of elongate capping members of inverted channel form comprising wall members which, when the channel members are placed in side-by-side arrangement, define therebetween channels which are upwardly open, the capping members being formed with outlets in upper regions thereof, and ballast means positioned in said upwardly open channels, which capping members are connected to each other at their lateral margins in association with the ballast means, the capping members being so formed that the capping arrangement is capable of floating on a body of slurry while being held thereon by said ballast means and being lifted therefrom by gas under pressure thereunder.

According to a second aspect of the invention, there is provided an anaerobic slurry digester which comprises a basin of substantially rectangular horizontal cross-section and having a substantially horizontal upper periphery, inlet means for supply of slurry to the basin below said periphery, means for removal of sludge from the basin and a capping arrangement according to the first aspect of the invention sized to lie within the basin with its outer margin adjacent the periphery thereof, disposed in an upper region of the basin.

A slurry digester according to the second aspect of the invention is especially useful where relatively small scale slurry digestion is required, as on farm sites. In preferred practice, the basin is an excavated trough of substantially rectangular horizontal cross-section in the earth which is lined to prevent liquid seepage. The lining then employed so as to prevent water seepage therefrom may be provided by butyl rubber or polyvinylchloride sealing sheet laid on a sand lining. Such a trough when provided on a farm site may be of a size such as can be readily excavated by conventional excavating equipment. Alternatively, the basin may be an above-ground construction. In general, however, reference will be made hereinafter to troughs as aforesaid, although it is not intended that this invention should be limited thereto.

The capping arrangement is essentially of modular form and can be readily adapted in accordance with the size of basin to be capped by provision of a suitable number and/or length of capping members. One form of capping arrangement which may be employed comprises a plurality of elongate members of substantially hemi-cylindrical cross-section and having at their lateral margins flange sections adapted for the coupling together of the sections when juxtaposed in parallel, the sections being formed with gas release outlets in upper regions thereof. Ballasting of the capping members may be provided by means of elongate tanks for positioning between adjacent capping members and communicable with the outlet tubes, which elongate tanks are adapted for supply of ballasting water thereto and removal of such water therefrom.

In an alternative form of capping arrangement, the capping members have upstanding lateral walls formed with shoulders on which rest ballast members which are substantially of letter T-shape in transverse cross-section. The shoulders are preferably profiled and the ballast members correspondingly shaped so that the ballast members coact with the shoulders to interconnect and hold together adjacent capping members.

With the first described preferred form of capping arrangement, ballasting is effected by supply of water to the elongate tanks in accordance with the amount of ballasting required. Whilst this allows for flexibility of operation, it makes for a more complicated system to operate. In contrast, with the second form of construction, solid ballasting may be employed in the upwardly open channels. By suitable shaping of the elongate capping members in their marginal regions, it is possible to employ preformed ballast members, formed particularly of concrete, to couple together adjacent capping members.

For a better understanding of the invention and to show how the same may be carried into effect, reference will now be made, by way of example only, to the accompanying drawings, wherein.

Figure 1:
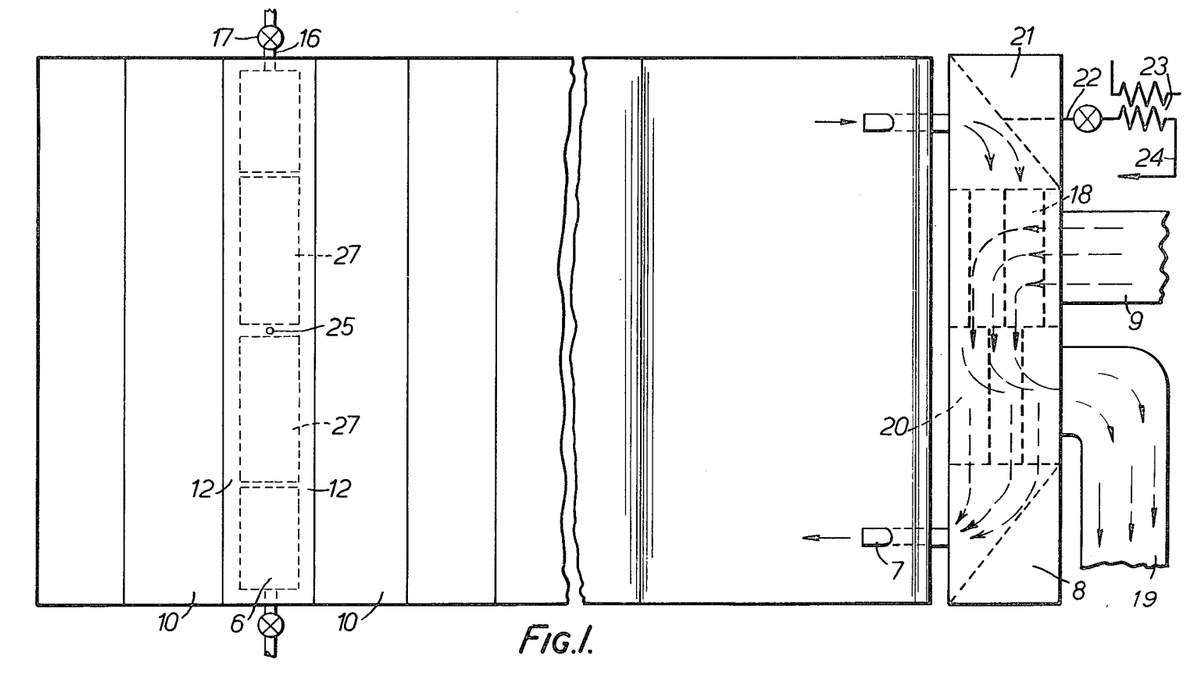
FIG. 1 is a plan view of one form of slurry digester according to the invention.
Figure 2:
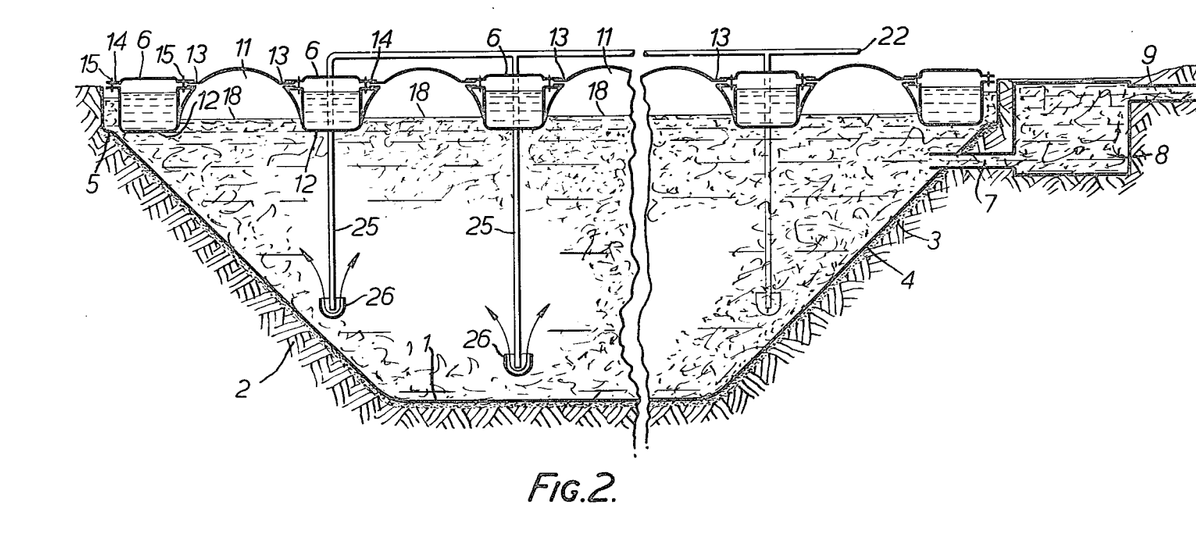
FIG. 2 is a cross-section through the slurry digester of FIG. 1 at II—II showing the capping arrangement thereof.

Referring to FIGS. 1 and 2, an anaerobic slurry digester shown therein comprises a trough 1 excavated in a body of earth 2 and rendered waterproof against seepage of water by provision of a sand lining 3 on which is placed a butyl rubber liner 4. The trough 1 is formed with opposed longitudinally extending shoulders 5 on which rest outermost elongate containers 6 when filled with water. An inlet duct 7 is provided for supply of sewage from a heat exchanger 8 having its own inlet pipe 9 for supply thereto of slurry from a stockyard.

The elongate containers 6 form part of a capping arrangement constituted by a plurality of elongate capping members 10 juxtaposed in parallel relationship and comprising semi-cylindrical chambers 11 having flanges 12 at the free margins thereof and connected together by connecting means (not shown in the drawing) for ensuring that a stable structure is produced. In their upper regions, the chambers 11 are provided with openings 13 which communicate with outlets 14 in the upper regions of the containers 6 and which are provided with valves 15 whereby the chambers 11 which can otherwise be placed in communication with each other through the containers 6 can be separated off from one another. The elongate containers 6 are provided with supply pipes 16 fitted with closure valves 17 for introduction thereinto and removal therefrom of water for providing water up to a variable level 18 therein (FIG. 2).

Referring specifically to FIG. 1, the heat exchanger 8 is of the passive type comprising, in addition to the inlet ducts 7 and 9, an outfall 19 to a lagoon, compost tank etc. The heat exchanger is formed with ducts 20 for through passage of fresh slurry and treated slurry which allow heat exchange to take place therebetween without direct contact occurring. A chamber 21 of the heat exchanger is formed with an outlet pipe 22 to a heat exchanger 23 for heating slurry from the digester and returning this slurry to the digester through a pipe 24. Rather than discharge the heated slurry at a single position into the digester, to achieve good stirring and agitation of slurry and to promote the digestion thereof, the pipe 24 supplies a plurality of descend pipes 25 located at intervals along the digester and terminating in cups 26 positioned adjacent the base of the digester. As a matter of convenience in constructing the overall digester, the pipes 25 pass through the cupping arrangement at positions intermediate sections 27 of each elongate container 6.

Operation of the slurry digester takes place in the following manner. Slurry from a stockyard is fed through inlet duct 9, heat exchanger 8 and inlet duct 7 so as to substantially fill the container. Initially, the capping arrangement simply rests on the trough 1 by seating of the flanges of chambers 11 on the shoulders 5. At such time, the containers will usually be empty. As the trough 1 fills up with slurry, a point will be reached at which the capping arrangement will be floated off the shoulders thereon. Gas pressure build up in the chambers 11 will cause the capping arrangement to rise and from time to time, adjustment of the water level in the elongate containers 6 will have to be made to ensure that the level of the capping arrangement is satisfactory. It is expected that, in practice, it would be most satisfactory if periodic adjustment of the water level in the container 6 is effected to maintain the gas pressure of 6" water (30 lb/ft$^2$) under the capping arrangement. After a certain period of operation, the gas pressure build up may be sufficient to allow release of gas, mainly methane, from the chambers 11. This can either be burnt off or used as a source of fuel at a nearby site.

Scum removal from the surface of the slurry in the trough 1 can be achieved over bands extending across the trough by closing off valves 15 and removing chambers 11 therebetween from their positions in the capping arrangement or utilising access ports (not shown) thereby allowing ready access to the upper surface of the slurry for skimming purposes. However, scum formation is in fact minimized by the supply arrangement for heated slurry to the trough. As the heated slurry is supplied to the trough at positions disposed over the cross-section of the trough, turbulence is set up and this is responsible for minimizing scum formation. The scum formation may be further reduced if the pipes 25 are formed with venturis (not shown) communicated with the upper region of the elongate containers 6 allowing methane to be drawn thereinto as a supply of gas which then bubbles upwardly through the slurry where it emerges from the pipes 25 at the cups 26. This venturi effect is equivalent to the use of a compressor for supplying gas under pressure to the interior of the trough 1.

The capping arrangement will generally be formed of plastics material, for example glass fiber reinforced plastics sprayed with polyurethane foam on the interior surfaces thereof as insulation to keep heat in.

Figure 3:
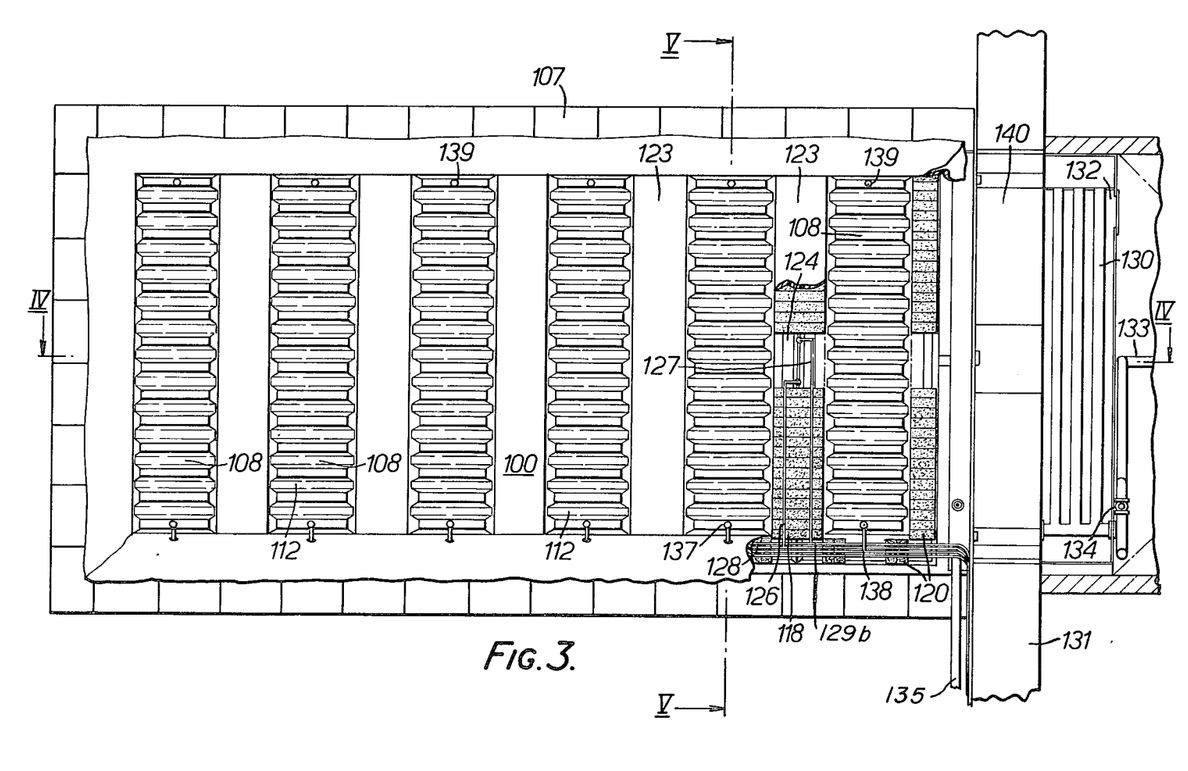
FIG. 3 is a plan view of an alternative form of slurry digester according to the invention.
Figure 4:
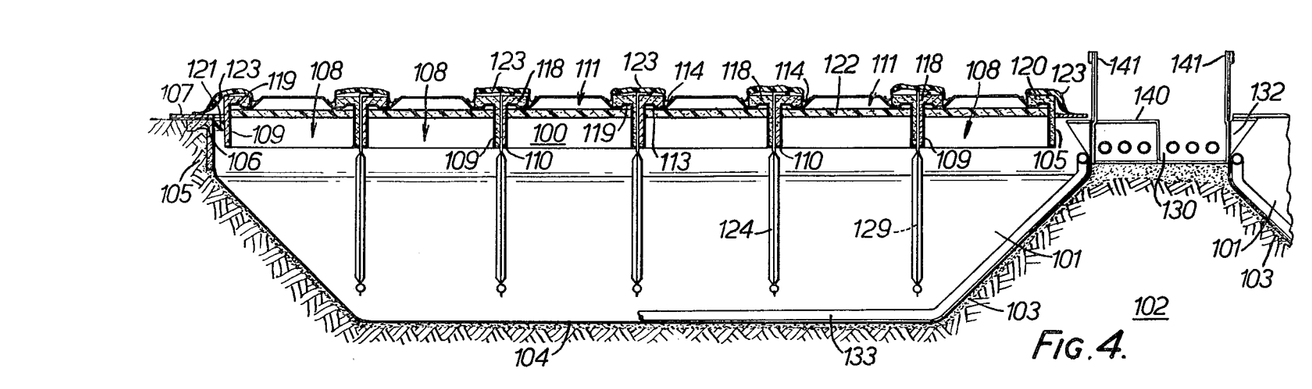
FIG. 4 is a cross-section through the slurry digester of FIG. 3 at IV—IV showing the capping arrangement thereon.
Figure 5:
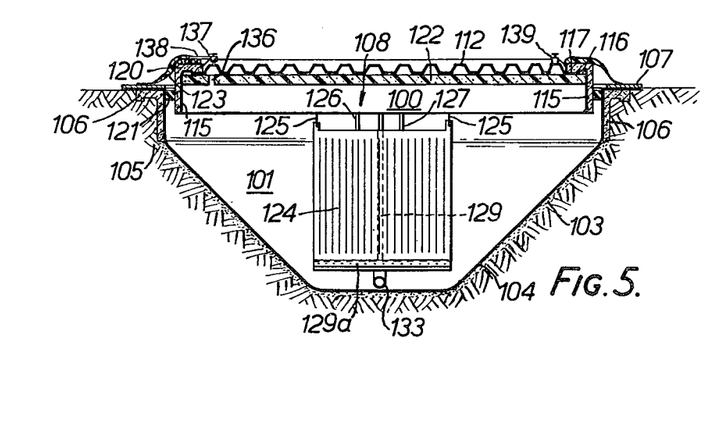
FIG. 5 is a cross-section through the slurry digester of FIG. 3 at V—V.

Referring next to FIGS. 3 to 5 of the accompanying drawings, a slurry digester arrangement comprises a pair of troughs 101 which, as will be described more fully hereinafter have a common service arrangement disposed therebetween. The use of a pair of digesters each comprising one of the troughs 101 allows one to be taken out of use and serviced, for example when the supply of slurry for digestion drops, as in summer when cattle sheds will be less in use. The righthand trough 101 is in all respects identical with the lefthand trough 101, although it is not shown in full or in complete detail in FIGS. 3 and 4. Each trough 101 is excavated in a body of earth 102 and rendered proof against seepage of water by provision of a sand lining 103 on which is placed a butyl rubber liner 104. The troughs 101 are both of trapezoidal vertical cross-section over the major part of their depth terminating in vertical wall sections 105 formed by elongate concrete members 106 of inverted L-section set in the earth and providing a stable margin for the trough. A walkway 107 formed of concrete paving slabs extends around the mouth of each trough, the concrete paving slabs extending from the mouth of each trough over the elongate concrete members 106 and onto the surface of the earth 102.

Each trough 101 is covered by a capping arrangement 100 formed of a plurality of elongate sections 108 juxtaposed in parallel relationship. Each elongate section 108 is formed as a molded fiber reinforced plastic member pigmented white and smoothly finished externally so as to reflect heat incident thereon. A preferred material for the elongate sections 108 is glass fiber reinforced acrylic-modified polyester resin for example a resin of 60% ester, 20% methylmethacrylate and 20% styrene composition. Both surfaces of the elongate sections are preferably coated with a vinyl silane finish to impart water repellent properties thereto. As can be seen better from FIG. 4, the elongate sections 108 are each formed with lateral side walls 109 terminating in outwardly directed flanges 110 and connected together through upper wall sections 111 which comprise central regions 112 which can be seen from FIGS. 3 and 5 to be of substantially corrugated form and which are flanked by horizontal portions 113 which are formed with channels 114 adjacent the central region 112. At their ends, the elongate sections 108 are formed in like manner to the lateral portions thereof, comprising vertical end walls 115 and horizontal portions 116 which incorporate channels 117 adjacent the terminal corrugations of the central region 112. The individual elongate sections 108 are not connected directly to each other but instead are connected to each other through ballast members 118 of T-shaped cross-section disposed between the lateral side walls of the elongate sections and whose cross pieces 119 are modified to engage the channels 114 of the elongate sections to connect them together by an interlocking action. The ballast members 118 may conveniently be formed of stone aggregate concrete having a density of 140 lb per cubic foot. Because of their density, for ready handling, a large number of ballast members 118 of relatively narrow width are provided between each pair of elongate sections (FIG. 3). The channels 114 in the elongate sections 108 which lie at the ends of the troughs 101 are occupied by suitably shaped portions of L-shaped ballast members 120 which in fact have a form equivalent to half of a T-shaped ballast member 118 and the form as a concrete member 106. Further L-shaped ballast members 120 are provided at the ends of the elongate sections, entering the channels 117 therein. The L-shaped ballast members 120 are spaced apart from the margins of the troughs and the entire capping arrangement comprising elongate sections 108 and ballast members 118 and 120 is intended to float on slurry in the trough and can be lifted therefrom by the pressure of methane gas generated during digestion of the slurry.

A sealing member 121 which does not inhibit the rising and falling of the capping arrangement is disposed between the L-shaped ballast members 120 and the vertical wall sections 105 of the trough.

It is desired to control the temperature of the slurry in the digester to be at the optimum value for digestion. Large temperature differences will generally result in microbial death. It is for this reason that the elongate sections are of white coloration so as to reflect incident sunlight. Moreover, thermal insulation is associated with the capping arrangement. Such thermal insulation takes the form of sections 122 of low density insulating material extending lengthwise of elongate sections 108. The insulating material may be the product available under the name Kaytherm which is a foamed lava product enclosed in a plastic, for example polyethylene cover. The upper surfaces of the ballast members 118 and 120 are covered with flexible strips 123 of insulating material which is here preferably a white insulation filled weather resistant polyvinyl chloride casing.

Further control of temperature within the troughs is provided by a heat exchanger arrangement comprising a plurality of pressed steel exchangers 124 suspended from the capping arrangement by suspension devices 125. The heat exchangers 124 comprise inlet and outlet pipes 126 and 127 which are led over the tops of the ballast members 118 to main pipes 128 and 129 for supply and removal of warm water from the heat exchangers. Passing down the middle of each heat exchanger is a gas supply pipe 129 which bifurcates at the bottom of the heat exchanger into two branches each formed with a plurality of openings 129a for escape of gas therefrom. The gas supply pipes 129 are connected through a pipe 129b to a compressor to which gas is to be supplied from the capping arrangement in use (not shown).

In the region between the two troughs 101, is provided a passive heat exchanger 130 wherein heat exchange is to take place between incoming and outgoing slurry. Slurry is supplied to the heat exchanger 130 through a slurry channel 131 from cow cubicles and enters the troughs 101 through a slurry entry gate 132. Slurry is removed from the troughs through a pipe 133 having a shut-off valve 134 to the heat exchanger 130 which it leaves through a pipe 135. Pipe 133 allows for the removal of slurry from the tank either by pumping out or by slurry displacement.

The insulation sections 122 have gaps 136 formed therein to allow methane which collects in the elongate sections 108 to pass into corrugations thereabove, which corrugations are provided with valves 137 for withdrawal of methane therefrom to pipes 138 for removing the methane from the digesters. At the opposite end of each elongate section to that provided with a valve 137 is provided a venting valve 139. Both valves 137 and valves 139 are tailed down (not shown) below the insulation.

A boarded walkway 140 having barriers 141 which provide handrails and pipe support is provided over the heat exchanger 130.

Operation of the slurry digester takes place in the following manner. Slurry from a stockyard is fed through slurry channel 131 and heat exchanger 130 and entry gate 132 into the trough 101 so as substantially to fill it. Initially, the capping arrangement will rest within the trough with the bottom edge region of the L-shaped ballast member 120 resting on the upper part of the sloping walls of the trough. As the trough fills up with slurry, a point will be reached at which the capping arrangement will be floated off. Warm water at a temperature monitored so as to be suitable for maintaining the slurry temperature at the optimum temperature for digestion thereof is fed into the heat exchangers 124 through the respective inlet pipes 126 and as digestion takes place, gas pressure build-up in the interior of the elongate sections 108 will cause the capping arrangement to rise as methane produced is collected thereunder. By forming the ballast members of 140 lb per cubic feet concrete, the capping arrangement will be progressively lifted clear of the slurry undergoing digestion in three stages. In the first stage there will be a build-up from 0 to 4 in.WG of the gas pressure. The capping arrangement will only have had to have lifted 6" or 150 mm to have generated this pressure (the minimum gas operating pressure). In the second stage 4 to 6 in.WG will be achieved and gas storage will occur while the capping arrangement lifts a further 500 mm. Gas may be removed from the capping arrangement through the valves 137 during this stage so as to maintain a gas pressure in the range 4 to 6 in.WG. In a third and final stage when gas pressure increases to 6 to 7 in.WG, and if this is be achieved in the absence of planned gas removal, the capping arrangement continues to lift until it vents from its rim. In this way safety blow-out will be achieved. The modified T-shape of the ballast members 118 is such as to allow this break up of the capping arrangement as a safety measure by application of sufficient gas pressure from below.

Scum removal from the surface of the slurry in the trough 101 can be achieved over bands extending across the trough by closing off valves 137, opening valves 139, removing ballast members 118 at the margins of the elongate sections 108 which is to be removed and then removing the elongate section 108 concerned thereby allowing ready access to the upper surface of the slurry for skimming purposes. However this is a somewhat time consuming operation, especially as dismantling of the various pipes passing over the ballast members 118 is required. In fact scum formation is in fact minimized by supply of methane under pressure through the gas supply pipes 129 into the bottom of the digester since as the methane emerges from the openings 129a, it bubbles upwardly through the slurry.

The methane removed from the elongate sections 108 of the capping arrangement can be burnt off or used as a source of fuel at a nearby site. In particular it may be employed to heat water to be supplied to the heat exchangers 124. Other methane may be burnt in an internal combustion engine connected to a generator thereby yielding electrical energy which may be used on a farm site, inter alia for operating a compressor for compressing a portion of the methane for return to the troughs through the pipe.

A capping arrangement according to this invention is modular in its construction and thus has the advantage that capping arrangements of any desired size can readily be built up from the basic elements. Moreover, by being capable of shutting off one from another, individual sections can be closed off when it is desired to remove scum or when a section has become defective.

By being provided at and below ground level, a slurry digester according to this invention is particularly suitable for use in hydroponic cultivation of plants. The hydroponic beds can be disposed over the capping arrangement using the contours thereof to define individual beds. Some heat loss will unavoidably occur from the slurry digester through the cap and this will be of direct benefit to the beds undergoing cultivation and which may be supplied with slurry from the digester as a source of organic nutrients.

I claim:

1. A capping arrangement for an anaerobic slurry digester of substantially rectangular horizontal cross-section, the capping arrangement comprising:
   a plurality of elongate capping members of inverted channel form of substantially semi-circular cross-section comprising wall members, including flange sections at their lateral margins, which, when said capping members are placed in side-by-side arrangement, define therebetween channels which are upwardly open, said capping members being formed with gas release outlets in upper regions thereof; and
   ballast means comprising elongate tanks resting on said flange sections in said upwardly open channels, said ballast means being provided with means for supply of water thereto and removal of water therefrom.
   wherein said capping members are connected to each other at their lateral margins in association with said ballast means, said capping members being so formed that the capping arrangement is capable of floating on a body of slurry while being held therein by said ballast means and being lifted therefrom by gas under pressure thereunder.

2. A capping arrangement as claimed in claim 1, wherein said gas release outlets are connected by duct means with upper regions of said ballast tanks.

3. A capping arrangement for an anaerobic slurry digester of substantially rectangular horizontal cross-section, the capping arrangement comprising:
   a plurality of elongate capping members of inverted channel form comprising wall members having upstanding lateral walls with shoulders which, when said capping members are placed in side-by-side arrangement, define therebetween channels which are upwardly open, said capping members being formed with outlets in upper regions thereof; and
   ballast means of substantially letter T-shape in transverse cross-section positioned in said upwardly open channels, such that either side of the heads thereof rests on said shoulders,
   wherein said capping members are connected to each other at their lateral margins in association with said ballast means, said capping members being so formed that the capping arrangement is capable of floating on a body of slurry while being held thereon by said ballast means and being lifted therefrom by gas under pressure thereunder.

4. A capping arrangement as claimed in claim 3, wherein said ballast members are solid.

5. A capping arrangement as claimed in claim 4, wherein said ballast members are formed of concrete.

6. A capping arrangement as claimed in claim 3, wherein said ballast members are solid and wherein said shoulders are formed with channels running lengthwise thereof and the heads of said ballast members are correspondingly shaped whereby the ballast members serve to hold together adjacent capping members by interlocking therewith.

7. A capping arrangement as claimed in claim 3, wherein said capping members are made of plastic and wherein said ballast means resting on said shoulders thereby connect said capping members together.

8. A capping arrangement as claimed in claim 7, wherein an upper wall of said capping members extending lengthwise thereof between said shoulders is substantially of corrugated form.

9. A capping arrangement as claimed in claim 8, wherein said capping members are formed of glass fibre reinforced plastics material.

10. An anaerobic slurry digester, comprising:
    a basin of substantially rectangular horizontal cross-section and having a substantially horizontal upper periphery and having a shoulder therearound below the upper periphery thereof;
    inlet means for supply of slurry to said basin below said periphery;
    sludge removal means for removal of sludge from said basin; and
    a capping arrangement sized to lie within said basin with its outer margin adjacent the periphery thereof, disposed in an upper region of said basin, which capping arrangement comrises—
      a plurality of elongate capping members of inverted channel form of substantially semi-circular cross-section comprising wall members, including flange sections at their lateral margins, which, when said capping members are placed in side-by-side arrangement, define therebetween channels which are upwardly open, said capping members being formed with gas release outlets in upper regions thereof, and
      ballast means comprising elongate tanks resting on said flange sections in said upwardly open channels, said ballast means being provided with means for supply of water thereto and removal of water therefrom,
      wherein said capping members are connected to each other at their lateral margins in association with said ballast means, said capping members being so formed that the capping arrangement is capable of floating on a body of slurry while being held thereon by said ballast means and being listed therefrom by gas under pressure thereunder, and wherein the endmost of said elongate tanks and the ends of each of said elongate tanks can rest on the shoulders of said basin.

11. A slurry digester as claimed in claim 10, wherein said basin is an excavated trough in the earth.

12. A slurry digester as claimed in claim 11, wherein said trough is lined so as to prevent water seepage therefrom.

13. A slurry digester as claimed in claim 12, wherein said lining comprises a sand lining on which is laid a rubber or plastic sealing sheet.

14. A slurry digester as claimed in claim 10, wherein said gas release outlets are connected by duct means with upper regions of said ballast tanks.

15. A slurry digester as claimed in claim 10, additionally comprising strips of thermally insulating material placed over said ballast members of the capping arrangement.

16. A slurry digester as claimed in claim 10, and further including indirect heat exchanger means for achieving heat exchange between slurry being fed to said basin and sludge being removed therefrom, when in use.

17. A slurry digester as claimed in claim 10, which additionally comprises heating means for heating of slurry in said basin.

18. A slurry digester as claimed in claim 17, wherein said heating means comprises duct means branched off from said sludge removal means, a heating arrangement associated with said duct means and further duct means for return of heated sludge to said basin.

19. A slurry digester as claimed in claim 18, wherein said duct means for returning sludge to the slurry digester comprises a plurality of sludge feed pipes comprising descender portions extending to a lower region of said basin at discrete intervals thereabout.

20. A slurry digester as claimed in claim 17, wherein said heating means comprises indirect heat exchangers suspended below the capping arrangement, which heat exchangers have supply ducts for supply of warm water thereto and outflow ducts for removal of water therefrom.

21. A slurry digester as claimed in claim 10 wherein said gas release outlets are connected by duct means with upper regions of said ballast tanks, and wherein the slurry digester further includes heating means for heating of slurry in said basin, said heating means comprising duct means branched off from said sludge removal means, a heating arrangement associated with said duct means and further duct means, for return of heated sludge to said basin, comprising a plurality of sludge feed pipes including descender portions extending to a lower region of the basin at discrete intervals thereabout through said elongate tanks, the descender pipes having venturis for drawing gas from said upper regions of the elongate tanks thereinto.

22. A slurry digester as claimed in claim 21, wherein said descender pipes open into cup-shaped members for upward deflection of matter issuing therefrom.

23. A slurry digester as claimed in claim 10, further comprising duct means for withdrawal of gas from upper regions of said capping members, compressor means for the gas and return duct means for return of gas to a lower region of said basin, said return duct means being formed at the lower region with a plurality of small apertures for injection of gas under pressure.

24. A capping arrangement as claimed in claim 23, wherein polyurethane foam plastic material is sprayed onto the interior surface of said capping members.

25. An anaerobic slurry digester, comprising a basin of substantially rectangular horizontal cross-section and having a substantially horizontal upper periphery, inlet means for supply of slurry to said basin below said periphery, sludge removal means for removal of sludge from said basin and a capping arrangement sized to lie within said basin with its outer margin adjacent the periphery thereof, disposed in an upper region of said basin, which capping arrangement comprises a plurality of elongate capping members of inverted channel form comprising wall members having upstanding lateral walls with shoulders which, when said capping members are placed in side-by-side arrangement, define therebetween channels which are upwardly open, said capping members being formed with outlets in upper regions thereof; and ballast means of substantially letter T-shape in transverse cross-section positioned in said upwardly open channels, such that either side of the heads thereof rests on said shoulders, wherein said capping members are connected to each other at their lateral margins in association with said ballast means, said capping members being so formed that the capping arrangement is capable of floating on a body of slurry while being held thereon by said ballast means and being lifted therefrom by gas under pressure thereunder.

26. A slurry digester as claimed in claim 25, wherein strips of foam material, the strips being of a non-water absorbing type, are disposed below upper walls of said capping members.

27. A slurry digester as claimed in claim 26, wherein said strips are formed of a foamed lava encased in synthetic plastic material.

28. An anaerobic slurry digester in accordance with claim 25, wherein said capping members are made of plastic and wherein said ballast means resting on said shoulders thereby connect said capping members together.

29. An anaerobic slurry digester as claimed in claim 28, wherein an upper wall of the said capping members extending lengthwise thereof between said shoulders is substantially of corrugated form.

30. An anaerobic slurry digester as claimed in claim 29, wherein said capping members are formed of glass fiber-reinforced plastic material.

31. An anaerobic slurry digester as claimed in claim 28, wherein said ballast members are formed of concrete.

32. An anaerobic slurry digester as claimed in claim 28, wherein said shoulders are formed with channels running lengthwise thereof and the heads of said ballast members are correspondingly shaped, whereby the ballast members serve to hold together adjacent capping members by interlocking therewith.

33. An anaerobic slurry digester as claimed in claim 28, wherein said basin is an excavated trough in the earth.

34. An anaerobic slurry digester as claimed in claim 33, wherein said trough has a sand lining on which is laid a rubber or plastic sealing sheet.

35. An anaerobic slurry digester as claimed in claim 28, and further including heating means for heating of slurry in said basin and duct means for withdrawal of gas from upper regions of said capping members, compressor means for the gas and return duct means for return of gas to a lower region of said basin, said return duct means being formed at the lower region with a plurality of small apertures for injection of gas under pressure, wherein said heating means comprise indirect heat exchangers suspended below said capping arrangement, said heat exchangers having supply ducts for supply of warm water thereto and outflow ducts for removal of water therefrom, and said heat exchangers being in the form of pressed steel panels down a central portion of which passes one of said return duct means and along a bottom region of which branches of the respective return duct means, formed with small apertures, are provided.

36. A capping arrangement as claimed in claim 25, wherein said capping members are colored white on the upper surfaces thereof.

37. An anaerobic digester, comprising:
a basin of substantially rectangular horizontal cross-section and having a substantially horizontal upper periphery;
inlet means for supply of slurry to said basin below said periphery;
sludge removal means for removal of sludge from said basin;
heating means for heating of slurry in said basin;
a capping arrangement sized to lie within said basin with its outer margin adjacent the periphery thereof, disposed in an upper region of said basin, which capping arrangement comprises
a plurality of elongate capping members of inverted channel form comprising wall members which, when said capping members are placed in side-by-side arrangement, define therebetween channels which are upwardly open, said capping members being formed with outlets in upper regions thereof, and
ballast means positioned in said upwardly open channels, said capping members being connected to each other at their lateral margins in association with said ballast means, said capping members being so formed that the capping arrangement is capable of floating on a body of slurry while being held thereon by said ballast means and being lifted therefrom by gas under pressure thereunder;
duct means for withdrawal of gas from upper regions of said capping members;
compressor means for the gas; and
return duct means for return of gas to a lower region of said basin, said return duct means being formed at the lower region with a plurality of small apertures for injection of gas under pressure;
wherein said heating means comprise indirect heat exchangers suspended below said capping arrangement, said heat exchangers having supply ducts for supply of warm water thereto and outflow ducts for removal of water therefrom, and said heat exchangers being in the form of pressed steel panels down a central portion of which passes one of said return duct means and along a bottom region of which branches of the respective said return duct means, formed with small apertures, are provided.

* * * * *